Sept. 1, 1953  L. C. BRANDEL  2,650,425
SLOTTED MIXING SPOON
Filed March 13, 1951
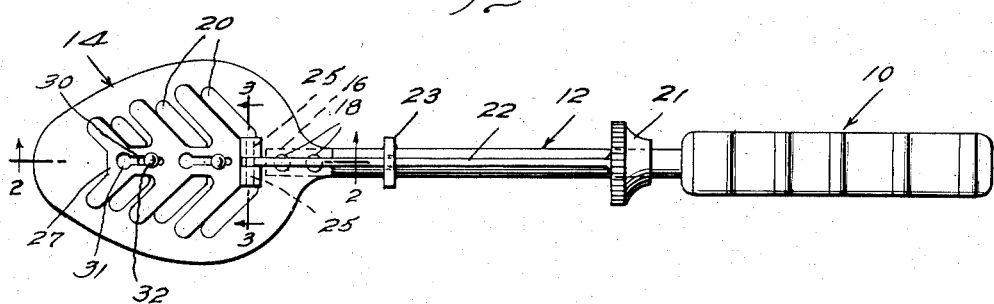
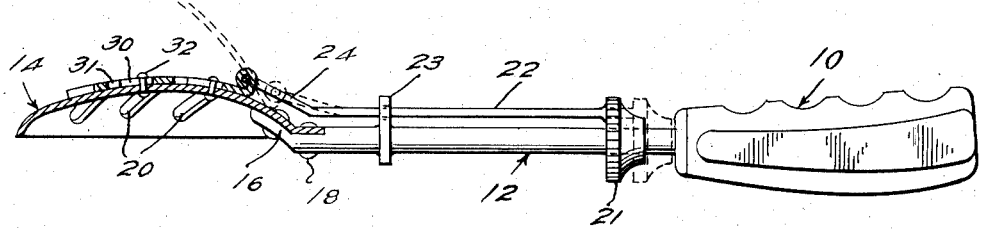
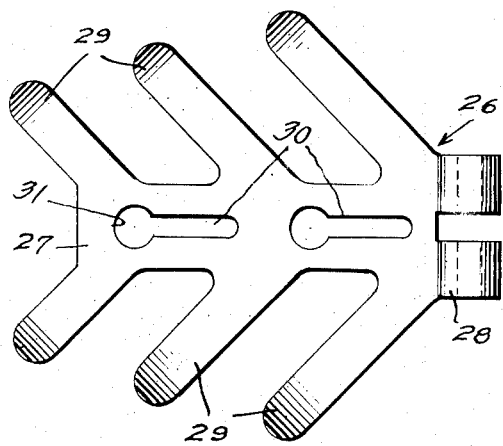
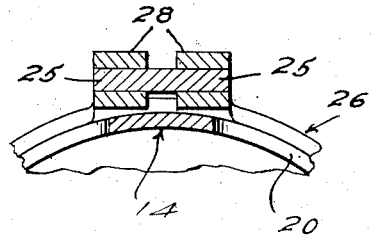
INVENTOR.
Leila C. Brandel
BY
Wilfred E. Lawson
ATTORNEY Patented Sept. 1, 1953

2,650,425

UNITED STATES PATENT OFFICE 2,650,425

SLOTTED MIXING SPOON

Leila C. Brandel, Burbank, Calif.

Application March 13, 1951, Serial No. 215,219

2 Claims. (Cl. 30—325)

This invention relates to culinary implements and is directed particularly to improvements in mixing spoons.

A particular object of the present invention is the provision of a mixing spoon having a bowl provided with a plurality of openings and means attached to the bowl whereby the said openings may be fully or partly covered for the carrying out of different mixing operations.

Another object of the invention is the provision of a mixing spoon having an apertured bowl provided with a sliding cover for fully or partly covering the apertures, wherein said cover has a novel mounting permitting it to be shifted away from the bowl of the spoon to facilitate cleaning of the parts.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in plan of the underside of the spoon showing the bowl, openings, cover and actuating means therefor.

Figure 2 is a view partly in side elevation and partly in longitudinal section of the same.

Figure 3 is a detail section on an enlarged scale on the line 3—3 of Figure 1.

Figure 4 is an enlarged detail showing the securing means between the openings, or slots, cover and the spoon bowl.

Referring more particularly to the drawing the numeral 10 generally designates the spoon handle, into the forward end of which is fixed in a conventional manner the tang, not shown, formed at one end of the shaft or shank 12, on the other end of which is carried the spoon bowl, generally designated 14.

While the spoon bowl 14 may be secured to the shank in any suitable manner, it is here shown as having a portion of the forward end of the shank curved slightly upwardly and forwardly, as at 16, and positioned against the inside surfaces of the spoon bowl, to which it is secured by rivets 18.

As shown the bowl of the spoon is provided with a plurality of openings 20 in the form of slots positioned on opposite sides of the longitudinal center of the bowl and disposed in forwardly diverging relation. This arrangement is preferred, though, obviously, any other form of openings, and arrangement, might be made use of.

Slidably mounted on the shank 12 adjacent to the handle 10 is a collar 21 and fixed in the collar is an end of a rod 22 which extends along the underside of the shank, through a fixed guide 23, secured to the shank 12.

The forward end of the rod 22 is bent outwardly from the back, or underside, of the spoon bowl as at 24, and terminates in the laterally extending hinge pin 25.

Positioned against the rounded back, or underside, of the bowl 14 is a slide which is generally designated 26.

The slide 26 is shaped to conform to the surface contour of the bowl and comprises a long central portion 27, which at one end is formed to provide the spaced hinge ears, or sleeves, 28, in each of which a hinge pin 25 engages. Extending forwardly and laterally from the two sides of the portion 27 are the cover fingers 29, each of which is adapted to cover a slot 20.

The central portion 27 of the slide 26 has therein the two end spaced slots 30, the forward end of which is enlarged as at 31.

In each slot 30 is engaged one of two guide pins 32, fixed in the back of the spoon bowl and each of these pins has a head which overlies the slide portion at the sides of the slot to hold the slide against the underside of the bowl, except when the slide is drawn all the way back to bring the pins into the enlarged ends 31 of the slots, where the slide may then be swung away from the bowl, on the hinge pin 25, as shown in dotted lines in Figure 2, for cleaning.

From the foregoing it will be readily apparent that when the spoon is to be used for ordinary cooking purposes, the collar is moved forward on the shank, thereby shifting the slide into position to cover the openings 20 by the fingers 29.

For mixing operations where it is desirable to have openings in the spoon bowl, such openings are obtained by shifting the slide back the desired extent, in the obvious manner.

I claim:

1. In a spoon of the class described, an oval shaped bowl provided with pairs of divergent slotted openings, the openings of each pair being spacedly disposed at opposite sides of the major axis of said bowl, an elongated shank extending from an end of said bowl, a handle on the free end of said shank, a cover element curved to conform to the outer surface of said bowl, said cover element comprising a longitudinal central portion and pairs of divergent fingers extending from opposite sides thereof, said fingers being normally disposed in overlying relation with respect to the said openings, an elongated actuating rod extending from the end of said cover element adjacent said shank in parallel relation to said shank, hinge connections between the adjacent ends of the rod and said cover element, a guide element for said rod mounted on said shank adjacent its point of connection with said bowl, and a collar, constituting a finger grip, mounted on the free end of said rod and slidably engaged with said shank for actuating the rod to move said cover element into and out of covering relation with respect to the said openings.

2. The spoon as defined in claim 1, with the said central portion of said cover element provided with a pair of longitudinally spaced keyhole slots, headed pins being carried by said bowl and engaged with said slots to allow for sliding movements of the cover element into and out of covering relation with respect to the said openings during reversed directional movements of said rod, said slots being disengaged from said pins to allow the cover element to be swung outward from the bowl when the cover element is moved into position to place the enlarged ends of said slots in registry with the heads of said pins and a further movement is imparted to said rod in the direction of said handle.

LEILA C. BRANDEL.

References Cited in the file of this patent

UNITED STATES PATENTS

| Number | Name | Date |
|---|---|---|
| 680,648 | Crandall | Aug. 13, 1901 |
| 1,334,169 | Royer | Mar. 16, 1920 |
| 1,648,906 | Lubrono | Nov. 15, 1927 |